(12) United States Patent
Cinotti

(10) Patent No.: US 11,538,599 B2
(45) Date of Patent: Dec. 27, 2022

(54) NUCLEAR REACTOR PROVIDED WITH A RAISED HEAT EXCHANGER

(71) Applicant: Luciano Cinotti, Recco (IT)

(72) Inventor: Luciano Cinotti, Recco (IT)

(73) Assignee: NEWCLEO LTD, London (GB)

( * ) Notice: Subject to any disclaimer, the term of this patent is extended or adjusted under 35 U.S.C. 154(b) by 397 days.

(21) Appl. No.: 16/314,747

(22) PCT Filed: Jul. 5, 2017

(86) PCT No.: PCT/IB2017/054055
§ 371 (c)(1),
(2) Date: Jan. 2, 2019

(87) PCT Pub. No.: WO2018/007961
PCT Pub. Date: Jan. 11, 2018

(65) Prior Publication Data
US 2019/0156961 A1    May 23, 2019

(30) Foreign Application Priority Data

Jul. 5, 2016 (IT) .......................... 102016000069589

(51) Int. Cl.
*G21C 15/12* (2006.01)
*G21C 1/03* (2006.01)
(Continued)

(52) U.S. Cl.
CPC ............... *G21C 15/12* (2013.01); *G21C 1/03* (2013.01); *G21C 1/32* (2013.01); *G21C 15/02* (2013.01); *F22B 35/004* (2013.01); *Y02E 30/30* (2013.01)

(58) Field of Classification Search
CPC ... G21C 1/02; G21C 1/03; G21C 1/32; G21C 1/326; G21C 15/02; G21C 15/12
See application file for complete search history.

(56) References Cited

U.S. PATENT DOCUMENTS

| 3,793,143 A * | 2/1974 | Muller | ...................... G21C 1/02 376/403 |
| 4,101,377 A * | 7/1978 | Berniolles | ................ G21C 1/03 376/405 |
| 5,078,959 A | 1/1992 | Cinotti | |

FOREIGN PATENT DOCUMENTS

| EP | 2238598 A2 * | 10/2010 | .............. F28F 9/013 |
| EP | 2238598 B1 | 6/2013 | |

OTHER PUBLICATIONS

International Search Report and Written Opinion for International Application No. PCT/IB2017/054055 dated Oct. 16, 2017.

* cited by examiner

*Primary Examiner* — Jack W Keith
*Assistant Examiner* — Joshua C Devorkin
(74) *Attorney, Agent, or Firm* — Dorsey & Whitney LLP

(57) ABSTRACT

A nuclear reactor cooled by liquid metal or by molten salts, provided with a heat exchanger, having inlet of the primary fluid in the lower part and circumferential outlet window in the vicinity of the free surface of the primary fluid in the cold collector. The outlet window is located in an intermediate position with respect to the tube bundle partially raised with respect to the free surface in the cold collector and supplied with primary fluid throughout its height by means of an ancillary device for creating an underpressure in the cover gas of the exchanger with respect to the cover gas in the vessel. The raising of the exchanger and the positioning of the outlet window in the vicinity of the free surface of the primary coolant help to minimize the displacement of primary fluid in the event of accidental release of secondary fluid inside the heat exchanger.

5 Claims, 2 Drawing Sheets

(51) Int. Cl.
*G21C 1/32* (2006.01)
*G21C 15/02* (2006.01)
*F22B 35/00* (2006.01)

NUCLEAR REACTOR PROVIDED WITH A RAISED HEAT EXCHANGER

TECHNICAL FIELD

The present invention concerns a nuclear reactor, in particular a liquid metal cooled nuclear reactor.

PRIOR ART

In many nuclear reactors, the heat produced in the core is transferred by means of a first process fluid, primary coolant (for example liquid metal), to a second process fluid (typically boiling water) by means of heat exchangers which can be positioned outside or inside of the primary vessel containing the reactor core.

In the particular case of a liquid metal cooled nuclear reactor, a liquid metal heat exchanger is installed inside said vessel in a volume which, with the reactor components contained in it, is called primary system; said system is filled with liquid metal up to a certain level, with the remainder containing a covering gas separating the liquid metal from the roof of the reactor in which the penetrations are located for the components of the primary system.

The primary coolant can be circulated by natural or forced circulation.

In many reactors, the primary coolant is a fluid with low vapour pressure which allows the primary vessel to be kept at a low pressure during operation of the reactor. The second process fluid is generally a fluid operating at a high pressure, and this means that the consequences of an accident involving breakage of one or more tubes of the heat exchanger and consequent outflow of said second process fluid must be taken into account. To avoid excessive pressurization of the primary vessel it is common practice to use a vent system which provides communication between the covering gas and a pressure suppression system.

In the current technology this accident is aggravated by the fact that said heat exchangers (for example with helical tubes, straight tubes, U-shaped tubes) (i) are very long, (ii) inside them, the primary coolant circulates from top to bottom with inlet window in the upper part, but well below the free surface of the primary coolant in order not to entrain the gas of the reactor roof and consequently (iii) the outlet window is very low (typically 5-10 m below the free surface of the primary coolant in a reactor with a power of hundreds of MW). In the event of breakage of the tubes, also the second process fluid is consequently released in depth in the vessel and causes significant displacements of primary coolant both inside the exchangers and outside them as it rises towards the vent system.

An improvement is obtained with the solution subject of the patent application MI2007A001685 which provides a flat spiral tube exchanger with outflow of primary coolant radially instead of vertically, but even this solution does not solve the problem because, in the event of breakage of a tube in the lower part of the tube bundle, the secondary coolant can be released into the primary vessel typically at a depth of 2-3 m.

SUBJECT OF THE INVENTION

An object of the present invention is therefore to provide a heat exchanger and a position inside a nuclear reactor which as a whole overcomes the drawbacks of the known solutions and has construction and safety advantages.

The present invention therefore concerns a heat exchanger as defined in the attached claim 1, with its ancillary characteristics and plant engineering configurations defined in the attached dependent claims.

Expediently, to reduce the maximum quantity of primary coolant displaced during the accident of breakage of the heat exchanger tubes, the primary coolant outflow window is positioned in an intermediate zone of the external casing of the exchanger at said free surface.

The exchanger tube bundle is partially raised with respect to the free surface of the primary coolant by means of a siphon configuration.

A tube bundle with flat spiral tubes is preferably used as described in the patent application MI2007A001685 where the cooling fluid is conveyed from bottom to top in the vertical duct inside the exchanger and then flows radially into the heat exchanger; after this, according to the invention, it is diverted by the external casing of the exchanger vertically, downwards or upwards for the fraction of primary fluid flowing through the upper or lower portion of the tube bundle respectively, to reach the outlet window in the vicinity of the free surface of the primary coolant in the cold collector of the reactor.

BRIEF DESCRIPTION OF THE DRAWINGS

The invention is further described in the following non-limiting embodiment examples, with reference to the figures of the attached drawings, in which.

PREFERRED EMBODIMENT OF THE INVENTION

Figure 1:
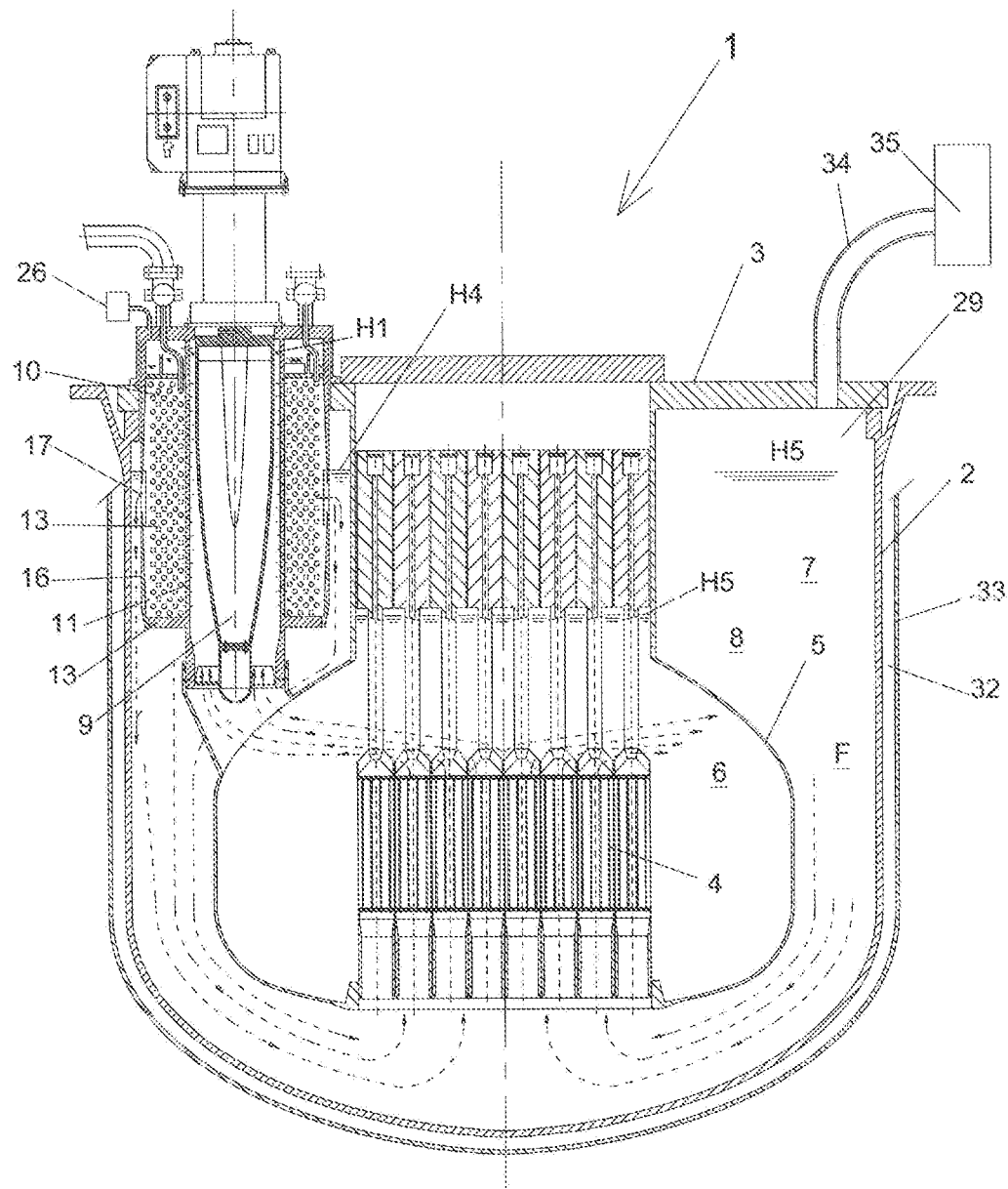
FIG. 1 is a sectioned schematic view of a nuclear reactor and of a heat exchanger according to the invention.
Figure 2:
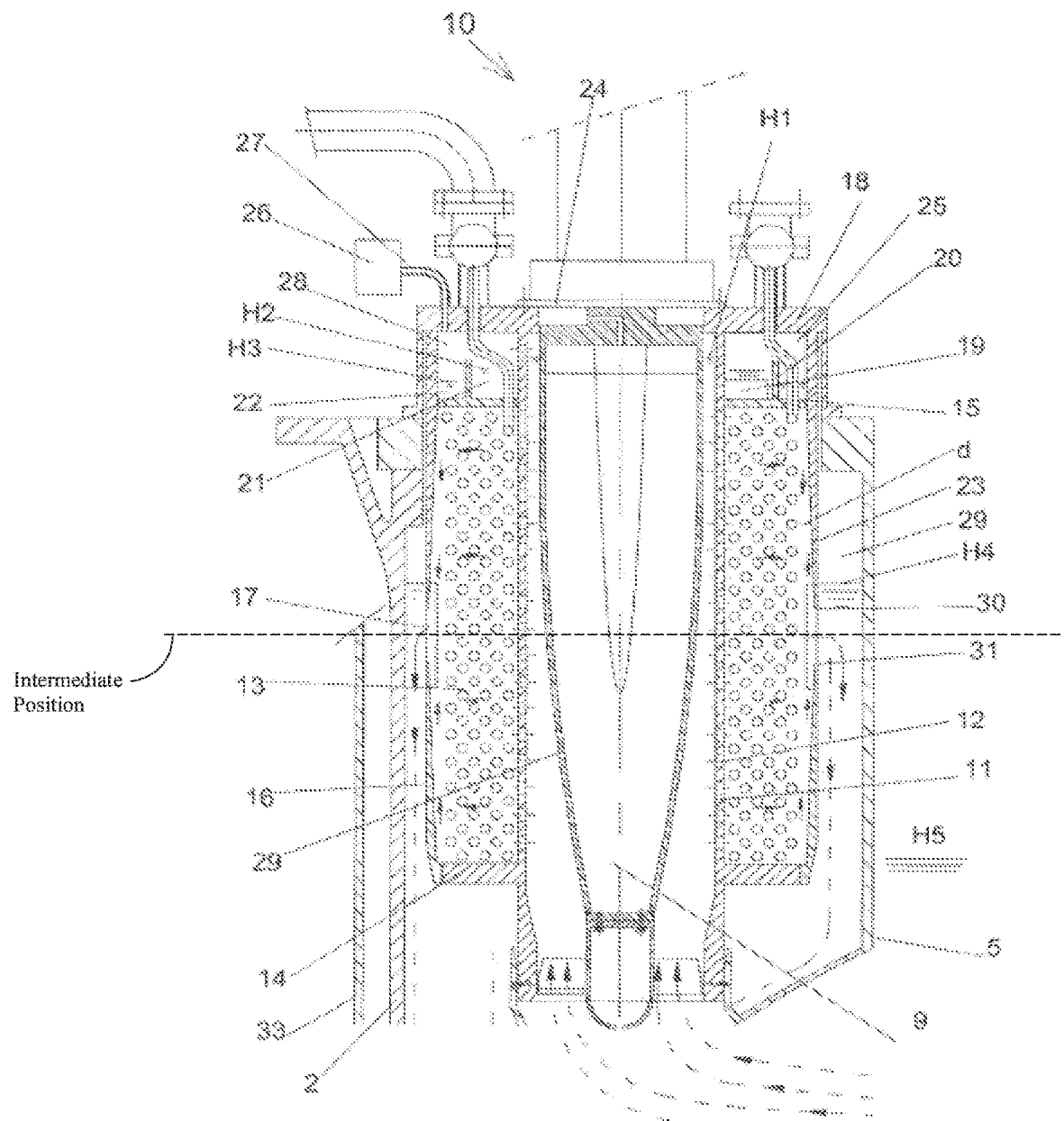
FIG. 2 shows an enlargement of the vertical section of the tube bundle of the exchanger according to the invention.

With reference to FIGS. 1-2, a nuclear reactor 1 comprises a container with a reactor vessel 2 covered by a roof 3 and containing inside it a core 4 and a hydraulic separating structure 5 delimiting a hot collector 6 and a cold collector 7 in which a primary fluid F for cooling the core 4 circulates.

The cold collector 7 is defined by an annular region 8 ranging between the reactor vessel 2 and the hydraulic separating structure 5 and is therefore arranged around the hot collector 6.

Inside the reactor vessel 2, immersed in the cold collector 7, pumps 9 are also housed for circulating the primary fluid F and heat exchangers 10, preferably steam generators, crossed by the primary fluid F, which transfer the power generated in the core to a secondary cooling fluid circulating in an external secondary circuit (known and not illustrated). Preferably, the primary fluid F is a liquid metal and in particular a heavy liquid metal, for example lead or lead-bismuth eutectic. Inside the reactor vessel 2 various ancillary devices are also housed, including for example support structures for the instrumentation and control bars, auxiliary heat exchangers for removal of the residual power, etc., not described for the sake of simplicity as they are known and do not pertain to the present invention.

The reactor 1 comprises a plurality of heat exchangers 10 for heat circulation and exchange, arranged entirely in the cold collector 7 and spaced circumferentially around the separating structure 5.

Preferably each heat exchanger 10 houses internally a circulation pump 9 which, when operating, pumps the level H4 of the primary fluid F in the cold collector 7 higher than the level H5 in the hot collector 6. Each of the heat exchangers 10 has a cylindrical internal shell 11 provided with holes 12 crossed by the primary fluid F to radially supply the tube bundle 13 closed at the bottom and top by means of respective lower and upper plates 14,15.

According to the present invention, the tube bundle 13 is closed by an external shell 16 of the exchanger 10, expediently having an axially variable thickness to delimit a corresponding radial gap d variable with respect to the tube bundle 13 and provided near the centre line of the tube bundle 13 with a circumferential window 17 for outflow of the primary fluid F from the heat exchanger 10. Expediently, the external shell 16 is integral with the closing plate 18 of the exchanger 10 and can slide vertically with respect to the lower plate 14 of the tube bundle 13.

The upper plate 15 of the tube bundle is integral with the internal shell 11 of the tube bundle 13 by means of radial partitions 19 and is provided with a vertical circumferential partition 20 separating an internal volume 21, hydraulically communicating with the inlet to the tube bundle 13, from an external volume 22 hydraulically communicating with the outlet of the tube bundle 13.

The portion 23 of external shell, above the window 17, the closing plate 18 of the exchanger and the flange 24, with relative seals, supporting the pump 9, constitute overall a structure having the shape of an upturned glass and delimit a volume 25.

An auxiliary device 26 not illustrated because it is known in the art, connected by means of a duct 27 to said volume 25, maintains the cover gas 28 therein in underpressure with respect to the cover gas 29 in the vessel 2 on the outside of the heat exchangers 10.

The cumulative effect of the underpressure in the cover gas 28, the head of the pump 9 and the pressure loss of the various parts of the primary circuit, determines five different levels of the primary coolant gradually decreasing from the level H1 inside the perforated shell 11, to level H2 of the volume 21, to level H3 of the volume 22, to level H4 of the cold collector 7 and to level H5 in the hot collector 6.

The circumferential window 17 is positioned so that:
 the upper edge 30 is always immersed in primary fluid as the level H4 of the cold collector varies following the various plant transients including the stop transient of the pumps 9;
 the lower edge 31 is always immersed in primary fluid of at least 50 mm also following lowering of the level of the primary fluid in the vessel 2 due to any loss of primary fluid from the vessel 2 and filling of the interspace 32 between the vessel 2 and the safety vessel 33.

The roof 3 is provided with a duct 34 connected to a control system 35 for control of the pressure in the cover gas 29 in the vessel 2.

The advantages of the solution are evident from the drawings.
 The positioning of the outlet window 17 from the exchanger in an intermediate position of the tube bundle 13 reduces the maximum distance (typically in the order of one metre) between the possible point of release of secondary fluid inside the exchanger 10 and the outlet window, minimizing, in the event of breakage of the exchanger tubes, the quantity of primary fluid F of the exchanger displaced by the secondary coolant under pressure as it overflows towards the cover gas 29.
 The positioning of the outlet window 17 from the exchanger in the vicinity of the free surface H4 in the cold collector 7 minimizes, in the event of breakage of the exchanger tubes, the mass of the primary fluid F external to the exchanger displaced by the secondary coolant under pressure as it overflows towards the cover gas 29. Typically, the secondary coolant under pressure can be released under a head of primary coolant with maximum depth of a few dozen cm instead of a few metres as in the known solutions.

In particular when the heat exchanger is a steam generator, the water-vapour mixture emitted by the breakage of one or more tubes of the steam generator completes the boiling in contact with the primary coolant F from which it separates at the level of the free surface H4 and then mixes with the cover gas 29, the pressure of which is controlled by the ancillary system 35 which, in the event of release of significant quantities of steam, operates as a pressure suppression system.

The partial raising of the tube bundle of the exchanger 10 from the free surface H4 of the cold collector 7 increases the relative difference in level with respect to the core with consequent improvement of performance in natural circulation.
 The uncovering of the upper edge 30 of the window 17 in the event of outflow of primary fluid F from the vessel 2 causes emptying of the portion of tube bundle of the exchanger 10 above the level H4, contributing to filling of the interspace 32 and avoiding, also with reduced dimensions of the window 17, uncovering of the lower edge 31 of the window 17 and stoppage of the circulation through the exchanger 10.

It is understood that modifications and variations which do not depart from the scope of the attached claims can be made to the exchanger and nuclear reactor provided with said exchanger previously described and illustrated.

The invention claimed is:
1. A nuclear reactor, comprising:
 a reactor vessel that houses a hot collector at least partially above a core and a cold collector surrounding the hot collector, the cold collector being separated from the hot collector by a separation structure and configured to circulate a primary fluid for cooling the core; and
 at least one heat exchanger secured to the reactor vessel and including:
 a bottom configured to receive the primary fluid coming from the hot collector; and
 an external shell positioned at least partially within the cold collector and defining a circumferential outlet window, the circumferential outlet window defining a singular opening through the external shell positioned at an intermediate position of a tube bundle of the at least one heat exchanger;
   wherein the heat exchanger houses internally a circulation pump which, when operating, pumps the primary fluid in the cold collector at a level higher than the level of the primary fluid in the hot collector; and
   the circumferential outlet window of the heat exchanger is positioned proximate to a free surface of the primary fluid in the cold collector higher than the level of the primary fluid in the hot collector; and
 an interspace between the reactor vessel and a safety vessel;
   wherein the circumferential outlet window comprises an upper edge and a lower edge of the singular opening such that if a level of the free surface of the primary fluid in the cold collector is lowered when at least some of the primary fluid of the reactor vessel leaks into and at least partially fills the interspace, the lower edge of the outlet window remains below the free surface of the primary fluid in the cold collector.

2. The nuclear reactor of claim 1, wherein the at least one heat exchanger further includes:
- an upper portion of the external shell, located above the outlet window;
- a closing plate secured to the external shell distal to the bottom; and
- a flange secured to the closing plate, the flange supporting the circulation pump, wherein at least a portion of the at least one heat exchanger forms a downward-facing cavity structure that delimits a volume of space in the at least one heat exchanger at a level vertically higher with respect to the free surface of the primary fluid in the cold collector.

3. The nuclear reactor of claim 2, wherein:
- a first portion of cover gas is in the cold collector of the reactor vessel;
- a second portion of cover gas is in the volume of space at a lower pressure than the first portion of cover gas, wherein an auxiliary device maintains the pressure of the first portion of cover gas; and
- the tube bundle of the at least one heat exchanger extends partially inside the volume of space, wherein the primary fluid also extends partially inside the volume of space because of the lower pressure of the second portion of the cover gas contained in the volume of space.

4. The nuclear reactor of claim 1, wherein the nuclear reactor is configured as a liquid metal cooled reactor.

5. The nuclear reactor of claim 1, wherein the at least one heat exchanger includes a steam generator.

* * * * *